US011683596B2

(12) United States Patent
Morikawa et al.

(10) Patent No.: US 11,683,596 B2
(45) Date of Patent: *Jun. 20, 2023

(54) IMAGE CAPTURE APPARATUS, ELECTRONIC APPARATUS, AND CHROMA SUPPRESSION PROGRAM

(71) Applicant: NIKON CORPORATION, Tokyo (JP)

(72) Inventors: Takatoshi Morikawa, Kawasaki (JP); Norimitsu Anada, Koga (JP)

(73) Assignee: NIKON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/528,663

(22) Filed: Nov. 17, 2021

(65) Prior Publication Data

US 2022/0078388 A1    Mar. 10, 2022

Related U.S. Application Data

(63) Continuation of application No. 16/770,291, filed as application No. PCT/JP2018/044650 on Dec. 5, 2018, now Pat. No. 11,212,500.

(30) Foreign Application Priority Data

Dec. 5, 2017    (JP) .............................. JP2017-233354

(51) Int. Cl.
*H04N 9/73*  (2023.01)
*H04N 5/235*  (2006.01)
(Continued)

(52) U.S. Cl.
CPC ............. *H04N 23/88* (2023.01); *H04N 23/71* (2023.01); *H04N 23/745* (2023.01)

(58) Field of Classification Search
CPC .... H04N 9/735; H04N 5/2351; H04N 5/2357; H04N 9/045; H04N 5/232
See application file for complete search history.

(56) References Cited

U.S. PATENT DOCUMENTS 8,358,355 B2     1/2013  Deguchi et al.
2003/0160876 A1  8/2003  Miyao et al.
(Continued)

FOREIGN PATENT DOCUMENTS

JP    2012-119780 A    6/2012
WO    2012073657 A1    6/2012

OTHER PUBLICATIONS

Feb. 5, 2019 International Search Report issued in International Patent Application No. PCT/JP2018/044650.
(Continued)

*Primary Examiner* — Padma Haliyur
(74) *Attorney, Agent, or Firm* — Oliff PLC

(57) ABSTRACT

An image capture apparatus includes: an acquisition unit configured to acquire image data of a subject; an identification unit configured to identify a color temperature of light from the subject on the basis of the image data acquired by the acquisition unit; an adjustment unit configured to adjust a white balance of the image data on the basis of the color temperature identified by the identification unit; and a suppression unit configured to suppress a chroma of the image data applied adjustment by the adjustment unit, if image data of a specific light-emitting body is included in the image data, on the basis of color information of the specific light-emitting body applied adjustment by the adjustment unit, by eliminating color of the specific light-emitting body applied adjustment by the adjustment unit.

11 Claims, 14 Drawing Sheets

| COLOR OF AMBIENT LIGHT | COLOR TEMPERATURE OF AMBIENT LIGHT | CHROMA SUPPRESSION PROCESS |
|---|---|---|
| BLUE | APPROXIMATELY 7000~8000K | AMBER ⇒ WHITE |
| GREEN (BLUE-GREEN) | APPROXIMATELY 6000~7000K | MAGENTA ⇒ WHITE |
| AMBER | APPROXIMATELY 4000K | BLUE ⇒ WHITE |

(A)

(B)

(51) Int. Cl.
*H04N 23/88* (2023.01)
*H04N 23/71* (2023.01)
*H04N 23/745* (2023.01)

(56) References Cited

U.S. PATENT DOCUMENTS

| | | |
|---|---|---|
| 2011/0019029 A1 | 1/2011 | Matsumoto et al. |
| 2015/0070528 A1 | 3/2015 | Kikuchi |
| 2015/0228098 A1 | 8/2015 | Kelley et al. |
| 2016/0212398 A1 | 7/2016 | Hattori et al. |
| 2016/0295189 A1 | 10/2016 | Fujiwara et al. |
| 2019/0132563 A1 | 5/2019 | Wang |

OTHER PUBLICATIONS

Feb. 12, 2021 Office Action Issued in U.S. Appl. No. 16/770,291.
Jun. 2, 2021 Office Action issued in U.S. Appl. No. 16/770,291.
Sep. 9, 2021 Notice of Allowance Issued In U.S. Appl. No. 16/770,291.
Aug. 13, 2021 Office Action issued in Chinese Patent Application No. 201880078518.3.

US 11,683,596 B2

IMAGE CAPTURE APPARATUS, ELECTRONIC APPARATUS, AND CHROMA SUPPRESSION PROGRAM

This is a Continuation of U.S. patent application Ser. No. 16/770,291 filed Sep. 28, 2020 (now U.S. Pat. No. 11,212, 500), which is a U.S. National Stage of International Application No. PCT/JP2018/044650 filed Dec. 5, 2018, which claims priority from Japanese Patent Application No. 2017-233354 filed in Japan on Dec. 5, 2017. The content of each of the above-identified applications is hereby incorporated by reference into this application in their entireties.

BACKGROUND

The present invention pertains to an image capture apparatus, an electronic apparatus and a chroma suppression program.

There exist techniques by which a light-emitting diode (LED) light source using LEDs is detected, and color correction is performed on the basis of the type of LED light source detected. If imaging is performed in a stadium using this technique, then because the color of ambient light differs from the color of an LED billboard that is an LED light source, if auto white balance (AWB) were to be performed on the ambient light, the color of images on the LED billboard would be changed, which would result in an image with an unnatural hue (see, for example, JP 2012-119780 A).

SUMMARY

An image capture apparatus as one aspect of the invention disclosed in the present application is an image capture apparatus comprising: an acquisition unit configured to acquire image data of a subject; an identification unit configured to identify a color temperature of light from the subject on the basis of the image data acquired by the acquisition unit; an adjustment unit configured to adjust a white balance of the image data on the basis of the color temperature identified by the identification unit; and a suppression unit configured to suppress a chroma of the image data applied adjustment by the adjustment unit on the basis of the color temperature identified by the identification unit if image data of a specific light-emitting body is included in the image data.

An electronic apparatus as one aspect of the invention disclosed in the present application is an electronic apparatus comprising: an acquisition unit configured to acquire image data of a subject; an identification unit configured to identify a color temperature of light from the subject on the basis of the image data acquired by the acquisition unit; a first adjustment unit configured to adjust a color of the image data on the basis of the color temperature identified by the identification unit; and a second adjustment unit configured to adjust the color of the image data applied adjustment by the first adjustment unit on the basis of the color temperature identified by the identification unit if image data of a specific light-emitting body is included in the image data.

A chroma suppression program as one aspect of the invention disclosed in the present application is a chroma suppression program that causes a processor to execute: an acquisition process of acquiring image data of a subject; an identification process of identifying a color temperature of light from the subject on the basis of the image data acquired in the acquisition process; an adjustment process of adjusting a white balance of the image data on the basis of the color temperature identified in the identification process; and a suppression process of suppressing a chroma of the image data applied adjustment in the adjustment process on the basis of the color temperature identified in the identification process if image data of a specific light-emitting body is included in the image data.

A chroma suppression program as another aspect of the invention disclosed in the present application is a chroma suppression program that causes a processor to execute: an acquisition process of acquiring image data of a subject; an identification process of identifying a color temperature of light from the subject on the basis of the image data acquired in the acquisition process; a first adjustment process of adjusting a color of the image data on the basis of the color temperature identified in the identification process; and a second adjustment process of adjusting the color of the image data applied adjustment in the first adjustment process on the basis of the color temperature identified in the identification process if image data of a specific light-emitting body is included in the image data.

DETAILED DESCRIPTION OF EMBODIMENTS

<Imaging Scene Example>

Figure 1:
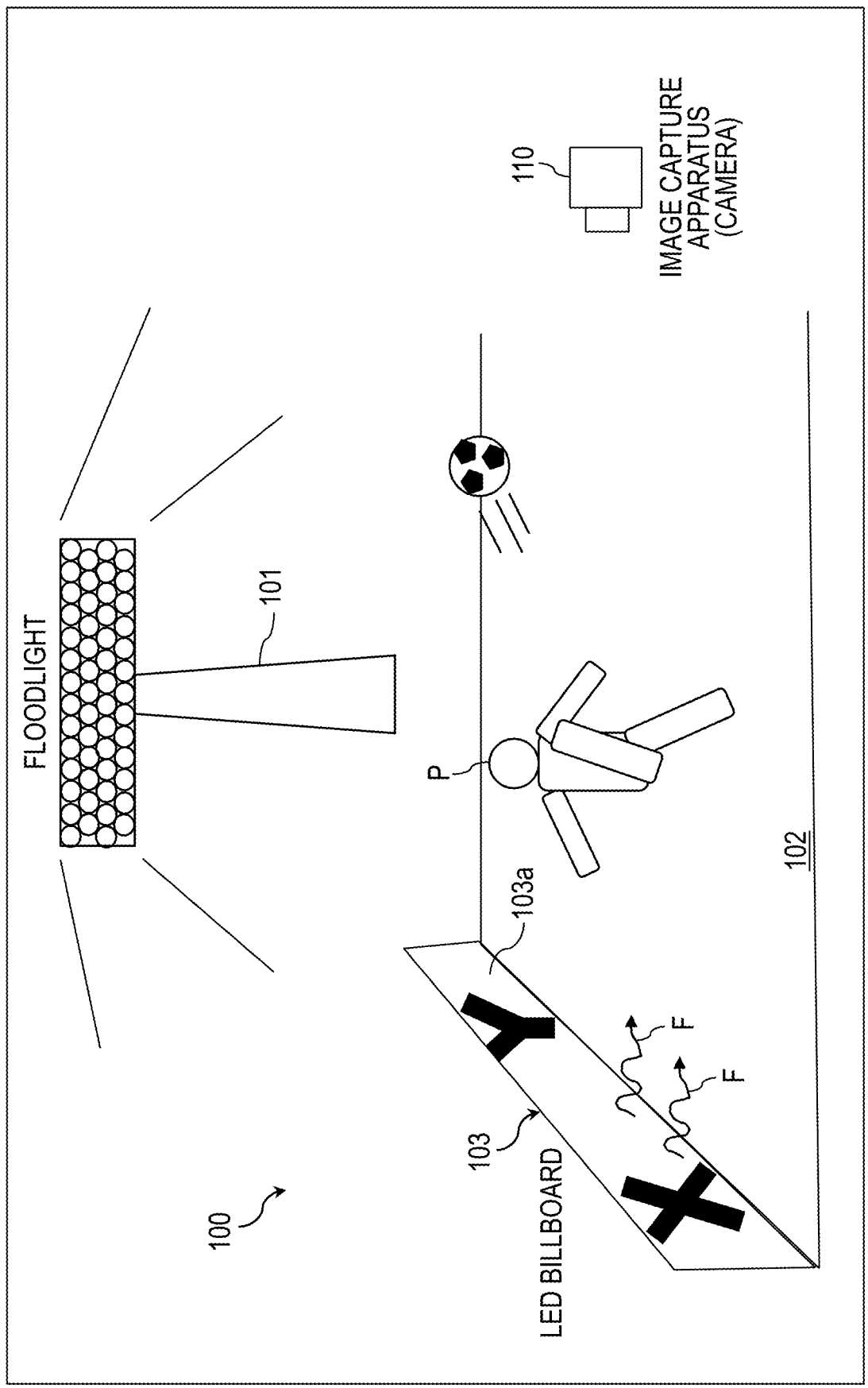
FIG. 1 is a descriptive view showing an example of an imaging scene.

FIG. 1 is a descriptive view showing an example of an imaging scene. FIG. 1 shows an example in which a soccer player P playing soccer in an outdoor stadium 100 is imaged. The stadium 100 has a lighting 101, a field (ground) 102, and an LED billboard 103. At night, the lighting 101 can be turned on to allow a soccer match to be played. Mercury lamps, metal halide lamps, and high-pressure sodium lamps are used for the lighting 101, for example. The lighting 101 is a non-LED light source.

The LED billboard 103 has a light-emitting surface 103a that faces the field 102, and is disposed in a position viewable by spectators of the soccer match. The LED billboard 103 emits a neutral white or daylight color light with a color temperature of approximately 4500-5800K. The light-emitting surface 103a displays an advertisement expressed in character strings and shapes, and in order to improve the visibility of the advertisement for the spectators, the background color of the advertisement is often white.

Figure 2:
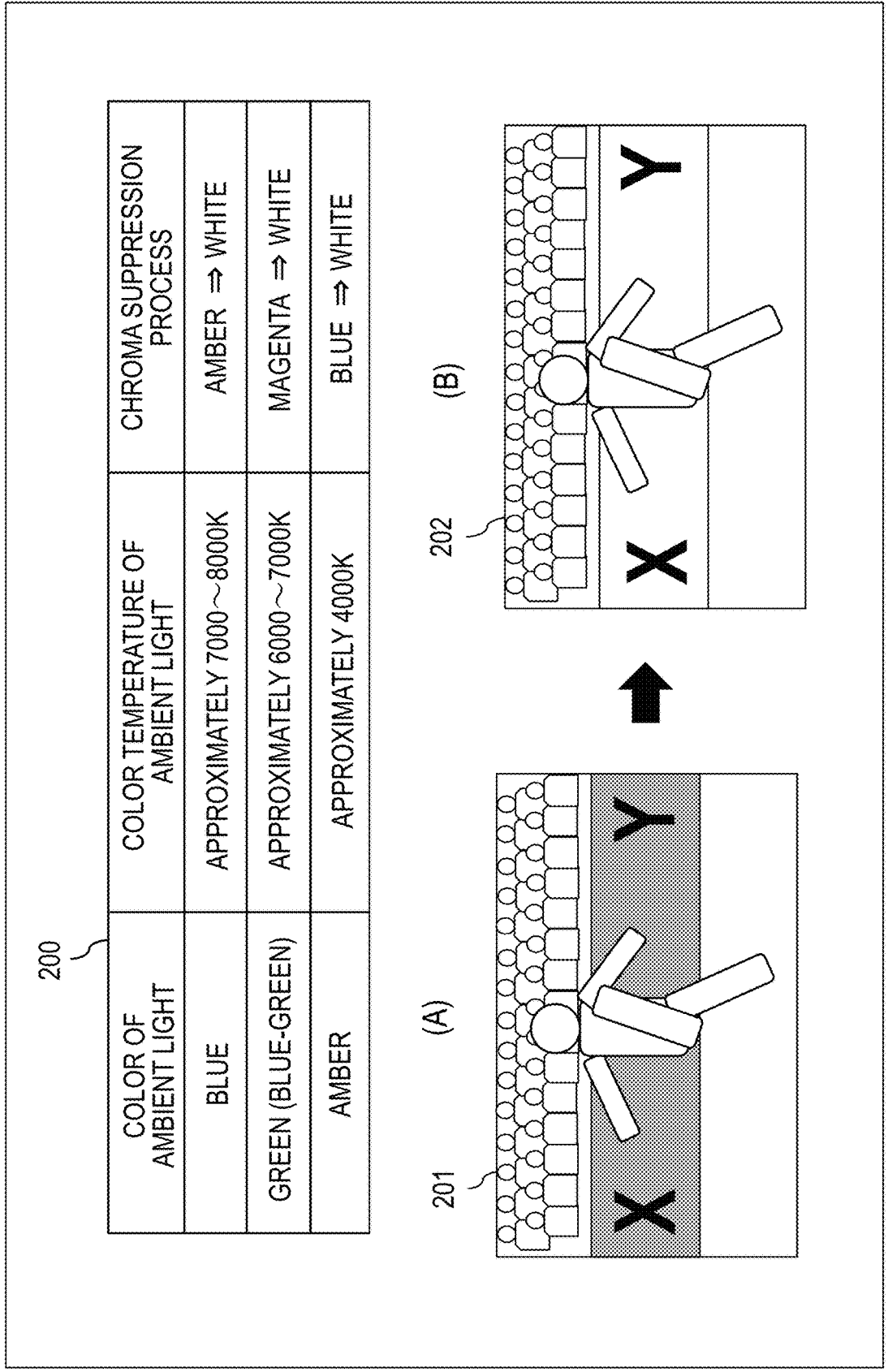
FIG. 2 is a descriptive diagram showing a chroma suppression example.

FIG. 2 is a descriptive diagram showing a chroma suppression example. The table 200 shows the relationship between the color of the ambient light, the color temperature of the ambient light, and a chroma suppression process. If the color of the ambient light from the lighting 101 is blue, then the color temperature thereof is approximately 7000-8000K. If the color of the ambient light from the lighting 101 is green (blue-green), then the color temperature thereof is approximately 6000-7000K. If the color of the ambient light from the lighting 101 is amber, then the color temperature thereof is approximately 4000K.

In a hypothetical example, in FIG. 1, an image capture apparatus 110 such as a digital camera or a digital video camera captures the soccer player P with the LED billboard 103 in the background, thereby attaining image data 201. The image data 201 is data of an image with the soccer player P as the primary subject, and with the LED billboard 103 and the spectators in the background.

In this case, the image capture apparatus 110 performs white balance adjustment in order to make the whites of the light-emitting surface 103a of the LED billboard 103 appear whiter, but this white balance adjustment is impacted by the ambient light from the lighting 101. Thus, if the ambient light is blue, then what should be white in the image displayed in the LED billboard 103 instead takes on an amber tinge. If the ambient light is green (blue-green), then what should be white in the image displayed in the LED billboard 103 instead takes on a magenta tinge. Similarly, if the ambient light is amber, then what should be white in the image displayed in the LED billboard 103 instead takes on a blue tinge.

Thus, the image capture apparatus 110 performs chroma suppression on the image displayed in the LED billboard 103 that has taken on an amber, magenta, or blue tinge as a result of white balance adjustment, in order to convert the color back to white. This conversion process is referred to as a chroma suppression process. (B) is image data 202 resulting from execution of the chroma suppression process on the image data 201 of (A), which is the image data prior to the chroma suppression process. As a result, white balance adjustment can be made more suitable. Conversion to white is a process by which the color of the LED billboard 103, which should be white, is shifted so as to appear closer to the original white.

<Hardware Configuration Example of Image Capture Apparatus 110>

Figure 3:
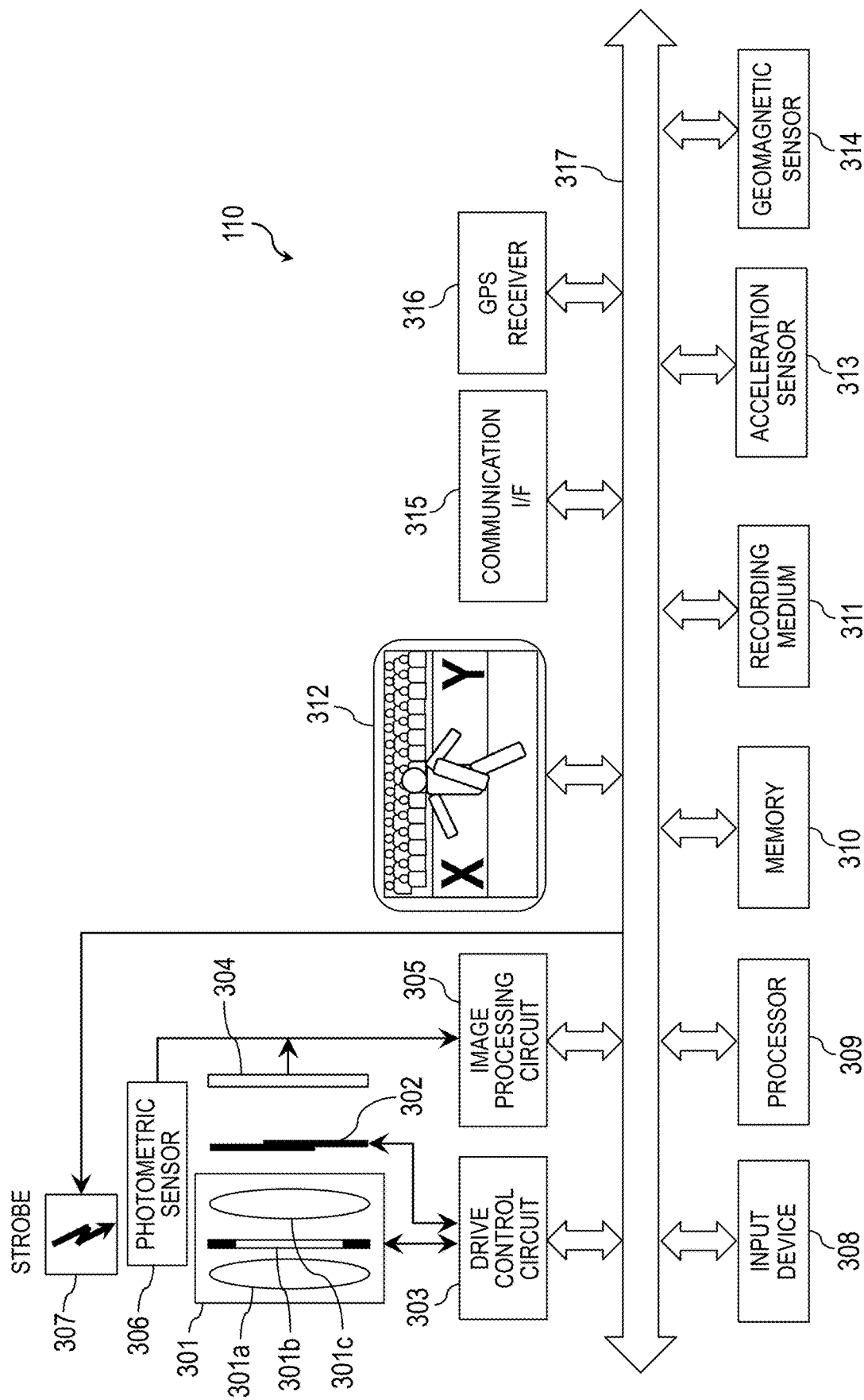
FIG. 3 is a block diagram for showing a hardware configuration example of the image capture apparatus.

FIG. 3 is a block diagram for showing a hardware configuration example of the image capture apparatus 110. The image capture apparatus 110 has a lens unit 301, a shutter 302, a drive control circuit 303, an image capture element 304, an image processing circuit 305, a photometric sensor 306, a strobe 307, an input device 308, a processor 309, a memory 310, a recording medium 311, a display device 312, an acceleration sensor 313, a geomagnetic sensor 314, a communication I/F (interface) 315, and a GPS receiver 316.

The drive control circuit 303, the image processing circuit 305, the input device 308, the processor 309, the memory 310, the recording medium 311, the acceleration sensor 313, the geomagnetic sensor 314, the communication I/F 315, and the GPS receiver 316 are connected to a bus 317.

The lens unit 301 has a condensing lens 301a, an aperture 301b, and a focus lens 301c. The condensing lens 301a condenses light from the subject and emits it towards the image capture element 304. The aperture 301b adjusts the amount of light from the condensing lens 301a. The focus lens 301c puts the subject in focus by moving in the optical axis direction of the focus lens 301c. The shutter 302 allows light from the lens unit 301 through to the image capture element 304 only during exposure, and shuts out light at all other times.

The drive control circuit 303 performs drive control of the lens unit 301 and the shutter 302. Specifically, for example, the drive control circuit 303 adjusts the degree of openness of the aperture 301b, controls the movement of the focus lens 301c along the optical axis direction, and controls the shutter 302 so as to be open or shut.

The image capture element 304 performs photoelectric conversion of light from the subject that has passed through the lens unit 301 and the shutter 302, and outputs an image signal to the image processing circuit 305 as RAW data. The image capture element 304 is a CMOS (complementary metal-oxide-semiconductor) image sensor or a CCD (charge-coupled device) image sensor.

The image processing circuit 305 executes, on the RAW data from the image capture element 304, various types of image processing such as a demosaicing process, noise removal, gradation correction, color correction, face detection, white balance adjustment, a color temperature identification process, a chroma suppression process, an encoding process, and a decoding process. The image processing circuit 305 is realized by an integrated circuit such as an ASIC (application-specific integrated circuit) or an FPGA (field-programmable gate array).

The photometric sensor 306 is a sensor that measures the amount of light from the subject. The strobe 307 is a device for emitting a flash. The photometric sensor 306 measures the amount of reflected flash from the subject.

The input device 308 is a device that triggers the image capture apparatus 110 through user operation. The input device 308 includes, for example, a release button, a dial for setting the imaging mode, buttons, and a touch panel.

The processor 309 controls the entire image capture apparatus 110. Also, the processor 309 uses a portion of the image processing circuit 305 to execute a chroma suppression program. The chroma suppression program is stored in a volatile memory 310 or a non-volatile recording medium 311.

The memory 310 serves as the work area of the processor 309. The recording medium 311 is attached in a detachable manner to the image capture apparatus 110 and records various data such as the image data 201 and 202. The recording medium 311 may be built into the image capture apparatus 110. The memory 310 and the recording medium 311 are collectively referred to as a "recording device." The recording device is a non-transitory or transitory recording medium that stores various programs and data.

The display device 312 displays an image (such as a still image, a video, or a live view image) formed by performing image processing on RAW data from the image capture element 304 using the image processing circuit 305, as well as various information and the like. RAW data is also a type of image data. The display device 312 is a monitor provided on the rear surface of the image capture apparatus 110. An electronic viewfinder is also a type of display device 312.

The acceleration sensor 313 detects acceleration along three perpendicular axes in the X direction, the Y direction, and the Z direction in order to detect the inclination of the image capture apparatus 110. The geomagnetic sensor 314 is a sensor that detects the cardinal direction that the image capture apparatus 110 faces. Using the acceleration sensor 313 and the geomagnetic sensor 314, it is possible to ascertain the cardinal direction and the degree of incline of the image capture apparatus 110.

The communication I/F 315 is a communication device that transmits and receives data. The GPS receiver 316 receives a signal from a GPS satellite and acquires current location information (latitude/longitude information) of the image capture apparatus 110.

<Functional Configuration Example of Image Capture Apparatus 110>

Figure 4:
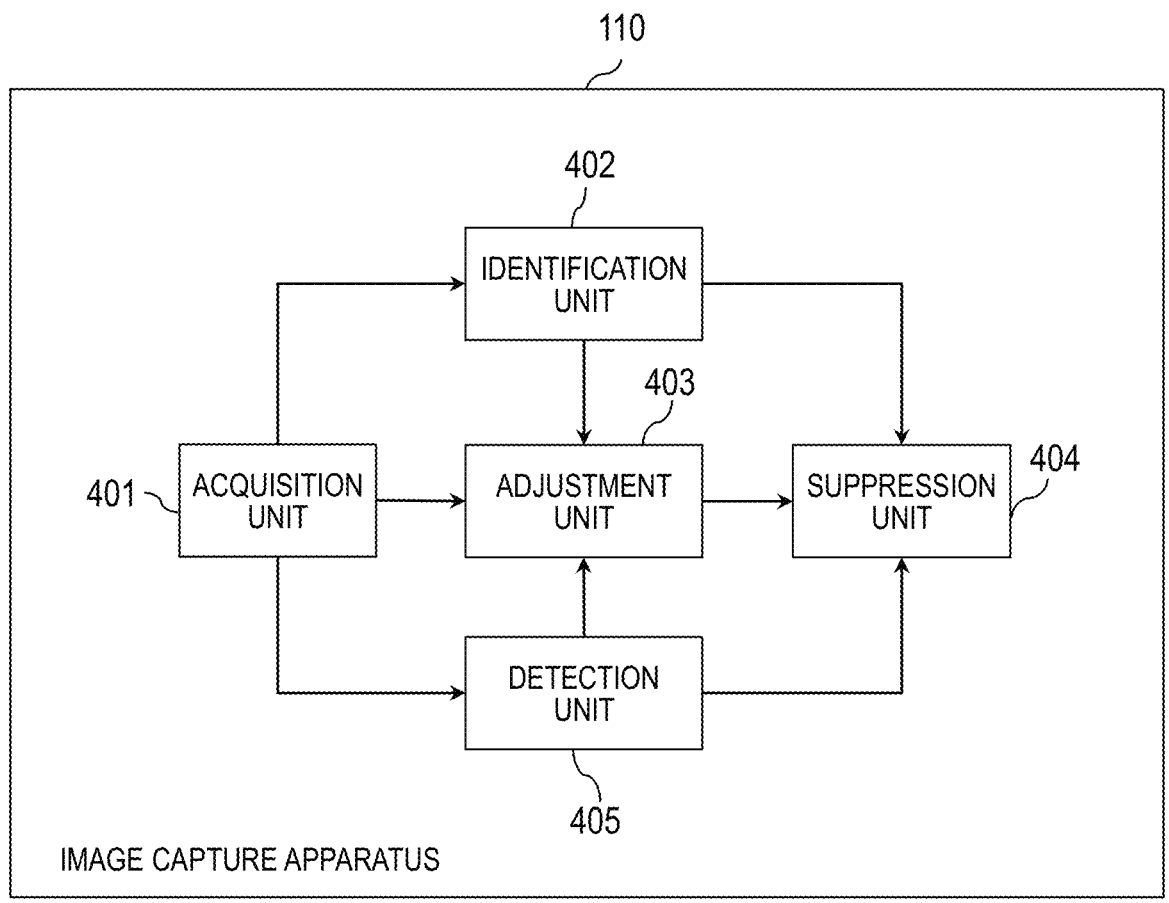
FIG. 4 is a block diagram showing a functional configuration example of the image capture apparatus.

FIG. 4 is a block diagram showing a functional configuration example of the image capture apparatus 110. The image capture apparatus 110 has an acquisition unit 401, an identification unit 402, an adjustment unit 403, a suppression unit 404, and a detection unit 405. The acquisition unit 401, the identification unit 402, the adjustment unit 403, the suppression unit 404, and the detection unit 405 specifically are functions realized by the image processing circuit 305 shown in FIG. 3, or by the chroma suppression program stored in the recording device shown in FIG. 3 being executed by the processor 309.

The acquisition unit 401 acquires image data of the subject. Specifically, the acquisition unit 401 acquires image data of the subject captured under a specific light source such as under the lighting 101 shown in FIG. 1, for example. The image data is the image data 201 including an image of the LED billboard 103 as the specific light-emitting body illuminated by the lighting 101 as shown in (A) of FIG. 2.

The identification unit 402 identifies the color temperature of the light from the subject on the basis of the image data acquired by the acquisition unit 401. Specifically, the identification unit 402 splits RGB image data acquired from the image capture element 304 into a plurality of blocks (each block is a group of one or more pixels), and each block is converted into YCbCr image data represented by a luminance signal (Y component) and color difference signals (Cb component (blue) and Cr component (red)), for example. The identification unit 402 then identifies the color temperatures corresponding to the color difference signals.

The luminance signal and the color difference signal of each block may be of pixels in a specific position within the pixel group of each block (such as the center or upper left), or may be the average, median, maximum value, or minimum value of the luminance signals and the color difference signals in the pixel group in each block.

Figure 5:
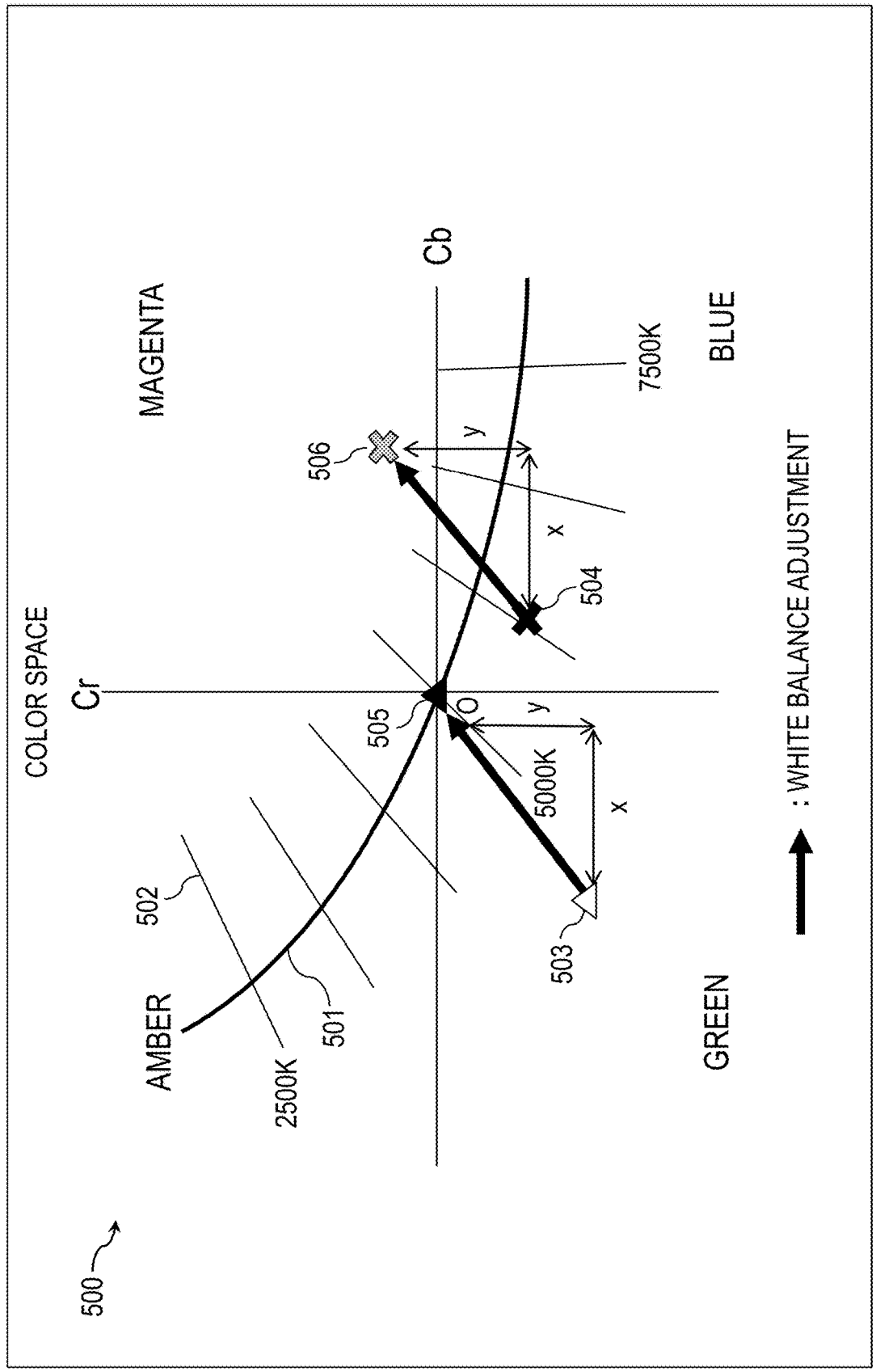
FIG. 5 is a descriptive view showing a relationship between the color space and the color temperature.

FIG. 5 is a descriptive view showing a relationship between the color space and the color temperature. Here, the color space 500 is a coordinate system defined by color difference signals Cb and Cr. In FIG. 5, the horizontal axis is Cb and the vertical axis is Cr. On the horizontal axis Cb, the direction from left to right is the +Cb direction and the direction from right to left is the −Cb direction. Similarly, on the vertical axis Cr, the direction from bottom to top is the +Cr direction and the direction from top to bottom is the −Cr direction (similarly applies to FIGS. 6 to 8 to be described later). In the color space 500, the first quadrant represents magenta, the second quadrant represents amber, the third quadrant represents green, and the fourth quadrant represents blue. As the adjacent quadrant is approached, the color of the adjacent quadrant is mixed in. The origin point O represents an achromatic color.

A color temperature curve 501 is set in the color space 500. The color temperature curve is a curve indicating preset color temperatures, and contour lines 502 that each indicates a single color temperature are present in a direction intersecting the curve. The color space 500 is recorded in advance in the recording device. If the color space 500 is not recorded in the recording device, the image processing circuit 305 or the processor 309 may refer to a computer that has the color space 500 through the communication I/F 315.

When the color difference signals Cb and Cr of the image data 201 are identified, the identification unit 402 plots the color difference signals Cb and Cr in the color space 500 to identify chromas 503 and 504 in the color space 500. The chromas of the image data 201 are plotted in the color space 500 for each block, and in order to simplify the explanation, two chromas 503 and 504 are given here as examples.

The identification unit 402 refers to the color temperature curve 501 set in the color space 500 to identify the color temperatures corresponding to the chromas 503 and 504. As a result, the identification unit 402 identifies an image region with the chroma 503 in the image data 201 as a non-LED region with a primary subject (soccer player P) and a background (spectators and field 102 excluding LED billboard 103), and identifies an image region in the image data 201 with the chroma 504 as an image region containing the LED billboard 103.

In FIG. 4, the adjustment unit 403 performs white balance adjustment on the image data 201 acquired by the acquisition unit 401. The adjustment unit 403 typically adjusts the white balance such that whites appear whiter. In performing this typical white balance adjustment, if the adjustment unit 403 acquires the image data 201 as described above, the impact (color temperature) of the ambient light from the lighting 101 causes the image of the LED billboard 103 to take on an amber tinge if the ambient light is blue, causes the image of the LED billboard 103 to take on a magenta tinge if the ambient light is green (blue-green), and causes the image of the LED billboard 103 to take on a blue tinge if the ambient light is amber.

Specifically, with reference to FIG. 5, the adjustment unit 403 executes white balance adjustment on the image data 201, causing the chroma 503 (green in third quadrant) in the color space 500 of the non-LED region to undergo translation to the origin point O by a correction amount x in the +Cb direction and a correction amount y in the +Cr direction, thereby being shifted to the origin point O indicating an achromatic color and becoming the chroma 505. Similarly, the chroma 504 in the color space 500 of the image region of the LED billboard 103 undergoes the same translation as that of the chroma 503 towards the origin point O, following the white balance adjustment of the chroma 503. Thus, the chroma 504 is converted to the magenta in the first quadrant to become a chroma 506, resulting in the white image of the LED billboard 103 taking on a magenta tinge.

In FIG. 4, if image data of a specific light-emitting body is included in the image data 201, the suppression unit 404 suppresses the chroma of the image data applied adjustment by the adjustment unit 403 on the basis of the color temperature identified by the identification unit 402. Specifically, if image data of the LED billboard 103 is included in the image data 201, the suppression unit 404 suppresses the chroma of the image data applied adjustment by the adjustment unit 403 on the basis of the color temperature of the LED billboard 103 identified by the identification unit 402. More specifically, if the light from the subject has a color temperature indicating blue, green, or amber, the suppression unit 404 suppresses the chroma of the image data 201 applied adjustment. Specific examples of the chroma suppression process performed by the suppression unit 404 are explained with reference to FIGS. 6 to 8.

Figure 6:
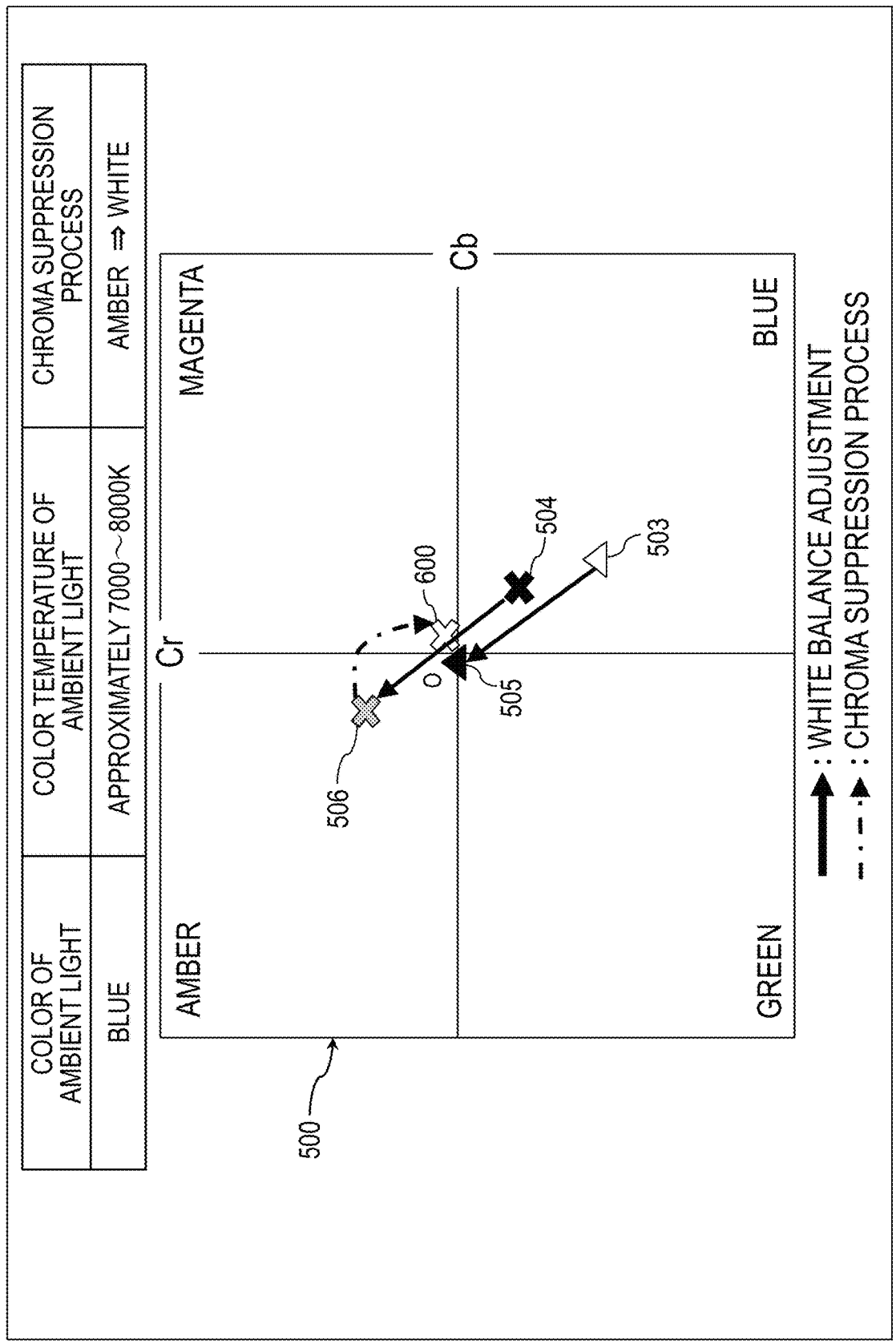
FIG. 6 is a descriptive view showing white balance adjustment and a chroma suppression process for when the ambient light is blue.

FIG. 6 is a descriptive view showing white balance adjustment and a chroma suppression process for when the ambient light is blue. In the case of FIG. 6, the chroma 503 of the non-LED region is positioned in the blue fourth quadrant and the chroma 504 of the LED billboard 103 is also located in the blue fourth quadrant. As a result of white balance adjustment by the adjustment unit 403, the chroma 503 of the non-LED region undergoes translation to the position of the origin point O (achromatic color) to become the chroma 505. Similarly, the chroma 504 of the LED billboard 103 undergoes the same translation as that of the chroma 503 of the non-LED region towards the origin point O, following the white balance adjustment of the chroma 503 of the non-LED region.

Thus, the chroma 504 of the LED billboard 103 is converted to the amber in the second quadrant to become the chroma 506, resulting in the white image of the LED billboard 103 taking on an amber tinge. Then the suppression unit 404 adjusts the values of the color difference signals Cb and Cr such that the chroma 506 of the LED billboard 103 that has taken an amber tinge is converted to the achromatic color of the origin point O to become a chroma 600. As a result, the amber can be removed from the image of the LED billboard 103 that has taken on an amber tinge so as to convert the color to white.

Figure 7:
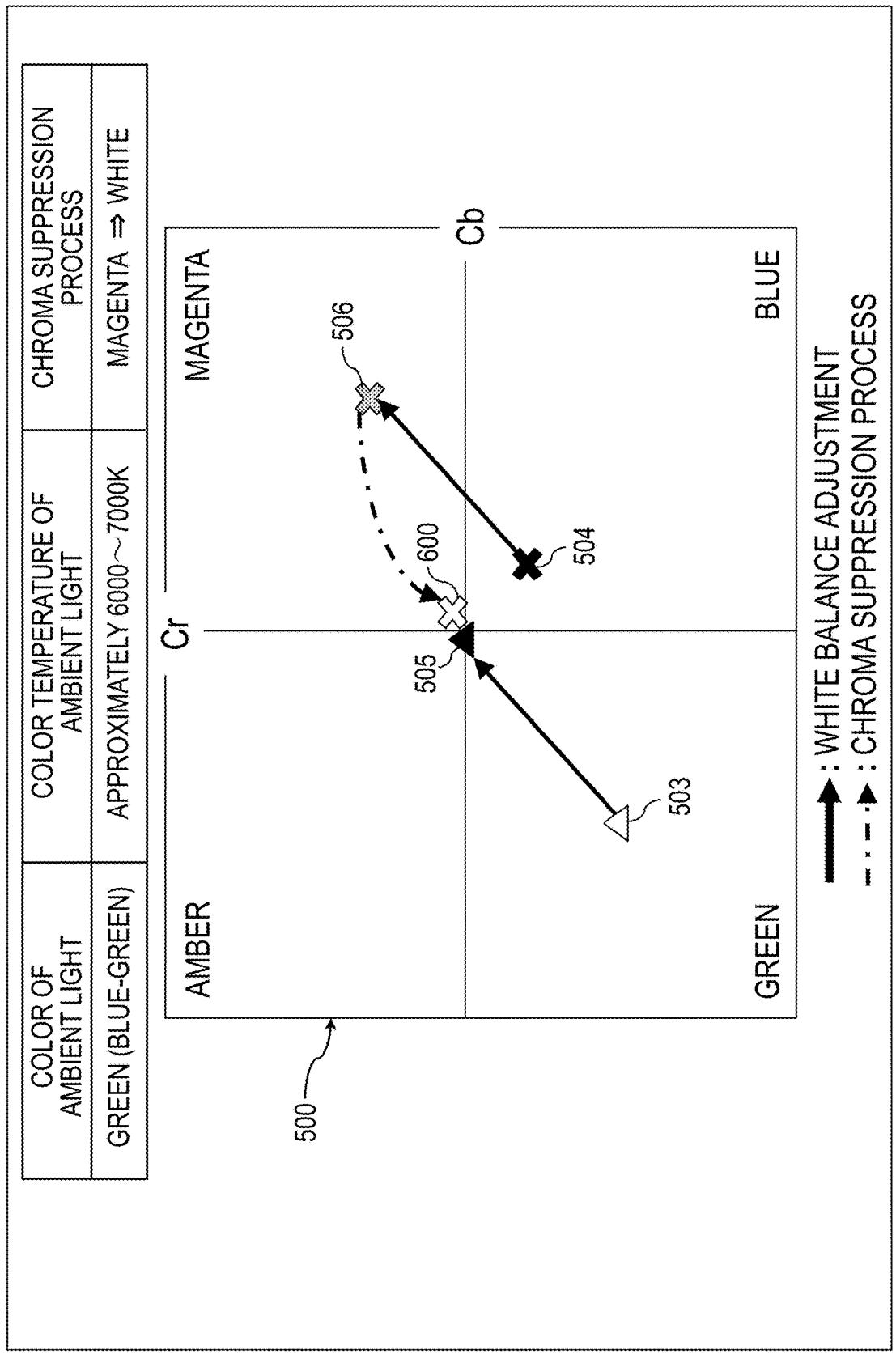
FIG. 7 is a descriptive view showing white balance adjustment and a chroma suppression process for when the ambient light is green (blue-green).

FIG. 7 is a descriptive view showing white balance adjustment and a chroma suppression process for when the ambient light is green (blue-green). In the case of FIG. 7, the chroma 503 of the non-LED region is positioned in the green third quadrant and the chroma 504 of the LED billboard 103 is located in the blue fourth quadrant. As a result of white balance adjustment by the adjustment unit 403, the chroma 503 of the non-LED region undergoes translation to the position of the origin point O (achromatic color) to become the chroma 505. Similarly, the chroma 504 of the LED billboard 103 undergoes the same translation as that of the chroma 503 of the non-LED region towards the origin point O, following the white balance adjustment of the chroma 503 of the non-LED region.

Thus, the chroma 504 of the LED billboard 103 is converted to the magenta in the first quadrant to become a chroma 506, resulting in the white image of the LED billboard 103 taking on a magenta tinge. Then the suppression unit 404 adjusts the values of the color difference signals Cb and Cr such that the chroma 506 of the LED billboard 103 that has taken a magenta tinge is converted to the achromatic color of the origin point O to become the chroma 600. As a result, the magenta can be removed from the image of the LED billboard 103 that has taken on a magenta tinge so as to convert the color to white.

Figure 8:
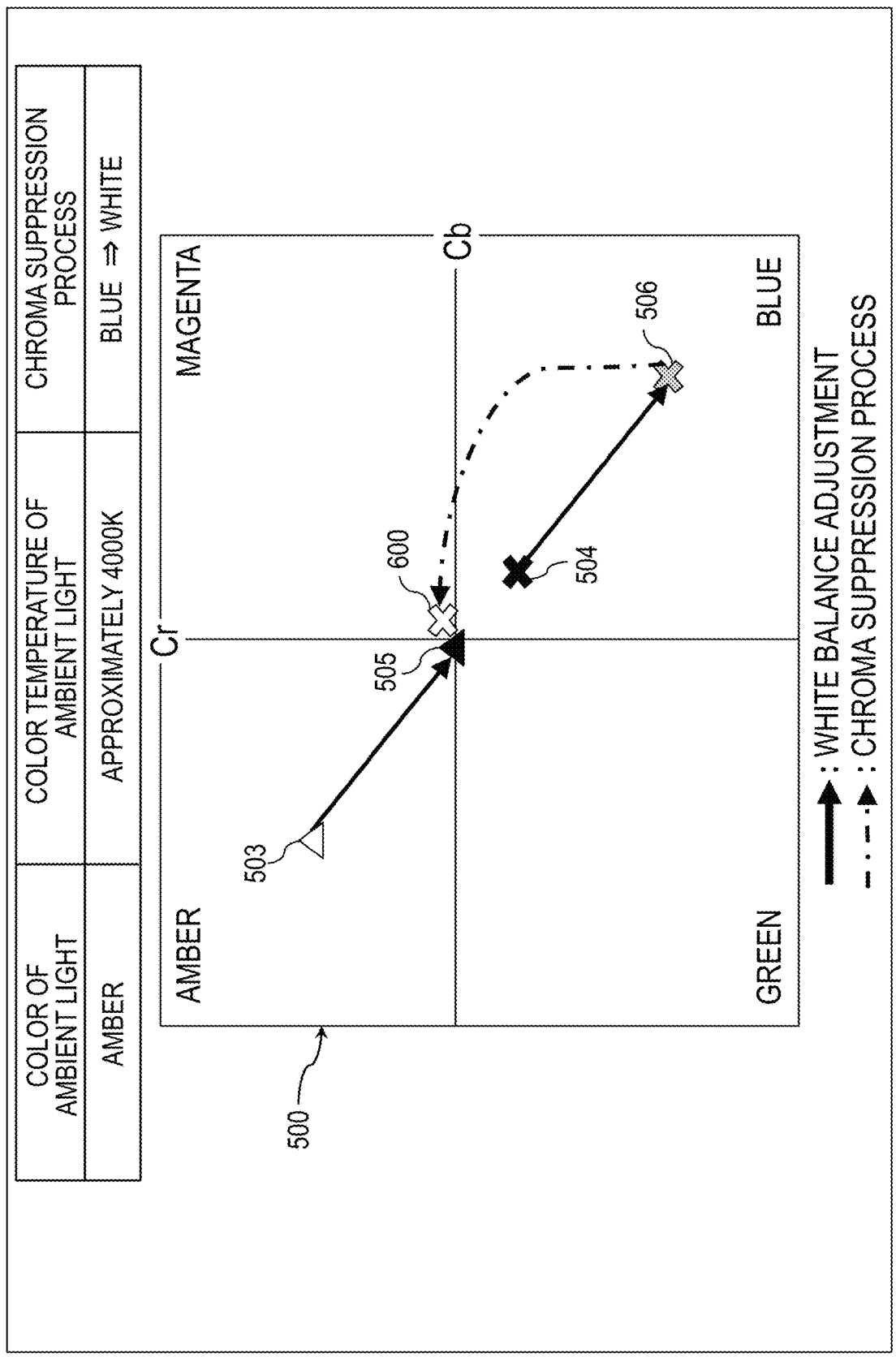
FIG. 8 is a descriptive view showing white balance adjustment and a chroma suppression process for when the ambient light is amber.

FIG. 8 is a descriptive view showing white balance adjustment and a chroma suppression process for when the ambient light is amber. In the case of FIG. 8, the chroma 503 of the non-LED region is positioned in the amber second quadrant and the chroma 504 of the LED billboard 103 is located in the blue second quadrant. As a result of white balance adjustment by the adjustment unit 403, the chroma 503 of the non-LED region undergoes translation to the position of the origin point O (achromatic color) to become the chroma 505. Meanwhile, the chroma 504 of the LED billboard 103 undergoes the same translation as that of the chroma 503 of the non-LED region towards the origin point O, following the white balance adjustment of the chroma 503 of the non-LED region.

Thus, the chroma 504 of the LED billboard 103 shifts within the fourth quadrant to become the chroma 506, resulting in the white image of the LED billboard 103 taking on a blue tinge. Then the suppression unit 404 adjusts the values of the color difference signals Cb and Cr such that the chroma 506 of the LED billboard 103 that has taken a blue tinge is converted to the achromatic color of the origin point O to become the chroma 600. As a result, the blue can be removed from the image of the LED billboard 103 that has taken on a blue tinge so as to convert the color to white.

In this manner, the suppression unit 404 can cause only the chroma 506 of the image region of the LED billboard 103, of which the color was rendered inaccurate by white balance adjustment performed by the adjustment unit 403, to undergo translation to the origin point O, thereby removing the ambient light color (amber, magenta, blue) from the image region of the LED billboard 103.

Also, which image region in the image data 201 is an image of the LED billboard 103 is determined by the position of the chroma 504 in the color space 500. Thus, the suppression unit 404 can execute the chroma suppression process on only the image region of the LED billboard 103.

In FIG. 4, the detection unit 405 detects flickering F by a specific light-emitting body included in the subject from the image data (live view image, for example) of the subject. The flickering F refers to the phenomenon of minor flickering occurring in the display. The specific light-emitting body is the LED billboard 103, for example, and the LED billboard 103 is a billboard with LEDs as the light source. LEDs have a larger luminance variation from flickering compared to fluorescent bulbs, and this flickering period is in the frequency of an alternating current power source (50 Hz or 60 Hz). If the frequency of the alternating current power source is 50 Hz, for example, then the flicker period is the inverse of double that frequency of 50 Hz: $\frac{1}{100}$ sec.

In performing rolling shutter control, for example, the detection unit 405 sets the frame rate of the image capture element 304 (high speed frame rate setting) such that the charge accumulation time per line of the image capture element 304 is greater than or equal to the flicker period ($\frac{1}{100}$ sec) and is n times (n being an integer of 1 or greater) the flicker period ($\frac{1}{100}$ sec). As a result, the charge accumulation time per line of the image capture element 304 differs from the period corresponding to the flicker period ($\frac{1}{100}$ sec), resulting in the flickering F. Thus, the detection unit 405 can detect the flickering F.

The trigger for high speed frame rate setting if capturing still images, for example, may be set to the time when a live view image is being taken in or an arbitrary time prior thereto, or may be set to a time when the release button is pressed halfway by the user, with the power source of the image capture apparatus 110 being ON.

In the present embodiment, detection of the flickering F may be performed using an existing technique. Also, in the present embodiment, the flickering F is not detected in order to suppress flickering, but rather, the detection of the flickering F is used to identify the presence of an LED light source such as the LED billboard 103. Thus, the image capture apparatus 110 uses the detection unit 405 to deliberately create a state in which the flickering F can be detected in order to detect the presence of an LED light source.

There are also cases in which flickering F is detected in the background other than from the LED billboard 103, and thus, the detection unit 405 may determine that the LED billboard 103 has been detected if the block group with the chroma 504 is a specific shape (such as a horizontally long rectangle), for example. As a result, it is possible to improve the detection accuracy for the LED billboard 103.

The detection unit 405 detects the flickering F using the image capture element 304 but may instead use the photometric sensor 306. By this configuration, even if a live view image is not being taken in, detection of the flickering F can be used to detect the LED light source in the subject.

When the flickering F is detected by the detection unit 405, the suppression unit 404 ascertains that the LED billboard 103 is present in the subject. Thus, when white balance adjustment is performed by the suppression unit 403, as described above, the image region of the LED billboard 103 takes on an amber, magenta, or blue tinge, and therefore, on the basis of the color temperature identified by the identification unit 402, the suppression unit 404 suppresses the chroma of the image data 201 applied adjustment by the adjustment unit 403 to attain the image data 202 as shown in FIGS. 6 to 8.

<Still Image Capturing Process Steps 1>

Figure 9:
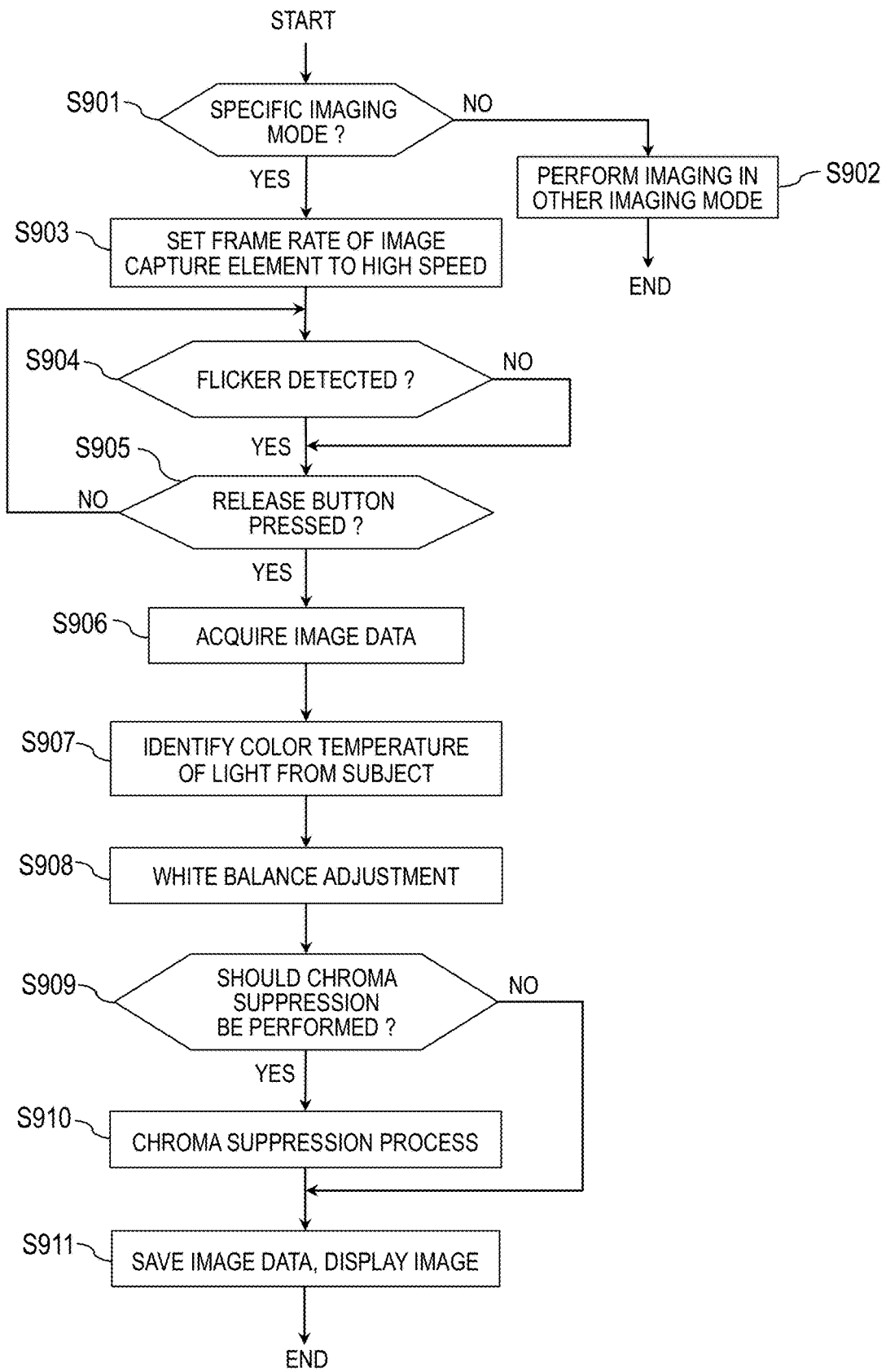
FIG. 9 is a flowchart 1 showing an example of still image capturing process steps by the image capture apparatus of the present embodiment.

FIG. 9 is a flowchart 1 showing an example of still image capturing process steps by the image capture apparatus 110 of the present embodiment. FIG. 9 is an example of still image capturing process steps for when the flickering F is detected by the detection unit 405. First, the image capture apparatus 110 determines whether the image capture apparatus 110 is in a specific imaging mode (step S901).

The specific imaging mode refers to an imaging mode by which auto white balance and the chroma suppression process are executed. The specific imaging mode is set by the user operating the input device 308 of the image capture apparatus 110, for example. If the image capture apparatus 110 is not in the specific imaging mode (step S901: no), then the image capture apparatus 110 performs imaging in another imaging mode (step S902).

On the other hand, if the image capture apparatus 110 is in the specific imaging mode (step S901: yes), then the image capture apparatus 110 sets the frame rate of the image capture element 304 to high speed (high speed frame rate setting) (step S903). In this manner, the flickering F can be detected if an LED light source is included in the subject.

Next, the image capture apparatus 110 detects the flickering F using the detection unit 405 (step S904), and determines whether the release button is pressed (step S905). If the release button is not being pressed (step S905: no), then the process returns to step S904. If the release button is being pressed (step S905: Yes), the image capture apparatus 110, acquires the image data (step S906). If the flickering F is detected in the subject when the release button is being pressed (step S904: yes), the acquired image data 201 has horizontal bands of unevenness, and if the flickering F is not detected in the subject when the release button is being pressed (step S904: no), the acquired image data does not have horizontal bands of unevenness.

Next, the image capture apparatus 110 uses the identification unit 402 to identify the color temperature of the light from the subject on the basis of the acquired image data as shown in FIG. 5 (step S907). Then, the image capture apparatus 110 uses the adjustment unit 403 to adjust the white balance of the image data on the basis of the identified color temperature as shown in FIG. 5 (step S908). Thereafter, the image capture apparatus 110 determines whether the chroma suppression process by the suppression unit 404 should be executed (step S909).

Specifically, if the flickering F is detected in step S904, for example (step S904: yes), this signifies that an LED light source is present in the subject. Thus, the white balance adjustment performed in step S908 results in the image of the LED billboard 103, which is an LED light source, to have an inaccurate color, and thus, the image capture apparatus 110 determines that the chroma suppression process should be executed (step S909: yes). On the other hand, if the flickering F is not detected (step S904: no), then the LED billboard 103 is not present in the subject, and thus, the image capture apparatus 110 determines that the chroma suppression process should not be executed (step S909: no), and the process progresses to step S911.

If it is determined that the chroma suppression process should be executed (step S909: yes), the image capture apparatus 110 causes the suppression unit 404 to execute the chroma suppression process as shown in FIGS. 6 to 8 (step S910), and the process progresses to step S911. Also, if it is determined that the chroma suppression process should not be executed (step S909: No), then the process progresses to step S911 without executing the chroma suppression process (step S910).

In step S911, the image capture apparatus 110 stores the image data 202 in the recording device or displays the image data 202 as an image in the display device 312 (step S911). If the chroma suppression process (step S910) is executed, then the image data 201 shown in (A) of FIG. 2, for example, is converted to the image data 202 resulting from chroma suppression of the image of the LED billboard 103 as shown in (B). As a result, the chroma of the image of the LED billboard 103 with the inaccurate color is suppressed, and the actual color of the subject can be reproduced.

<Chroma Suppression During Video Capturing>

Next, chroma suppression for video capturing will be described. The above-mentioned color inaccuracy on the image of the LED billboard 103 occurs not only in still images but also when capturing video. Thus, detection of the flickering F when capturing video, that is, detection of the LED light source in the subject will be described here.

Figure 10:
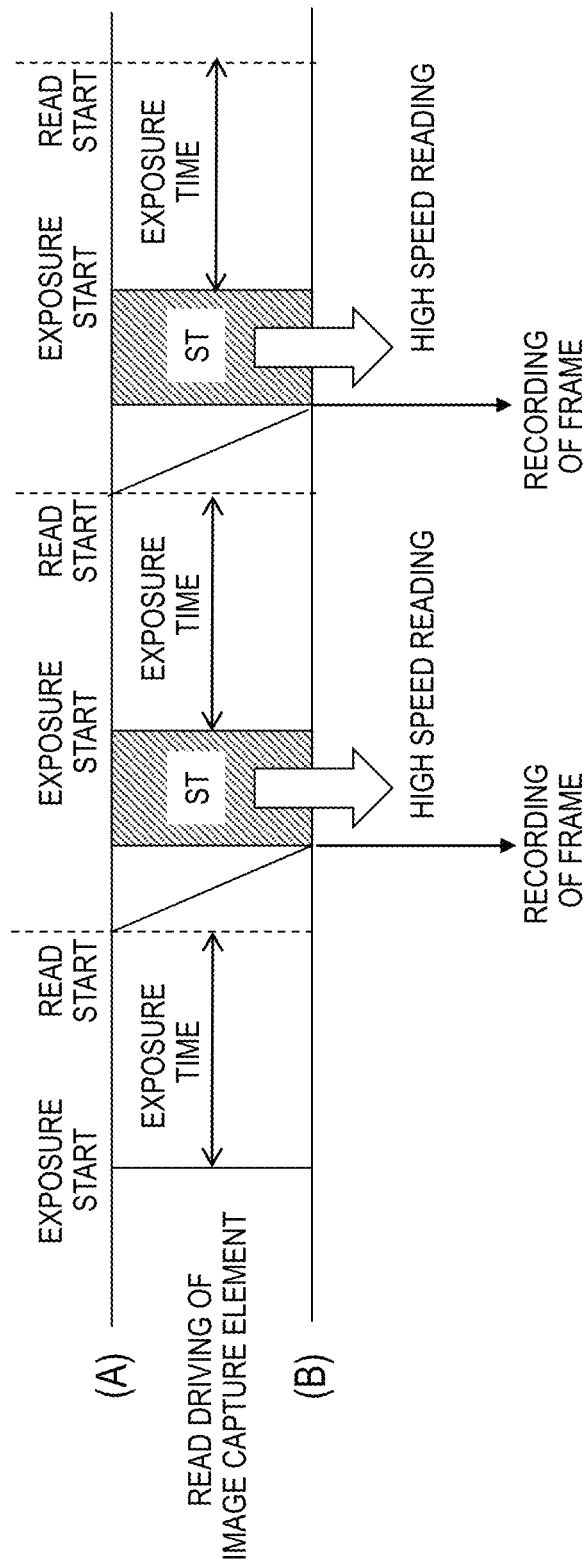
FIG. 10 is a timing chart showing an example of reading frames during high speed sampling rate setting when capturing video.

FIG. 10 is a timing chart showing an example of reading frames during high speed sampling rate setting when capturing video. In FIG. 10, (A) shows a time axis for the exposure or frame read start timing and (B) shows the time axis for the ending period for frame reading, or in other words, the recording timing to the recording device. The horizontal axis is the time axis.

When capturing video, for each frame, the time from the start of exposure to the start of frame reading and frame recording is the imaging process for recording one frame. In this manner, when capturing video, each frame is recorded in the recording device, and during a gap time ST from the end of frame recording to the start of exposure for the next frame, the image capture apparatus 110 engages in high speed reading of the frame for detecting the flickering F. Specifically, at the timing when recording the frame, the image capture apparatus 110 sets the frame rate such that the charge accumulation time per line of the image capture element 304 is greater than or equal to the flicker period ($1/100$ sec) and is n times (n being a natural number) the flicker period ($1/100$ sec) (high speed frame rate setting), for example.

When starting the next exposure, the frame rate is restored to the original frame rate for video capturing. As a result of the high speed frame rate setting during the gap time ST, the image capture apparatus 110 causes the detection unit 405 to read at high speed a frame for detecting the flickering F and detects the flickering F in the frame.

<Video Capturing Process Steps 1>

Figure 11:
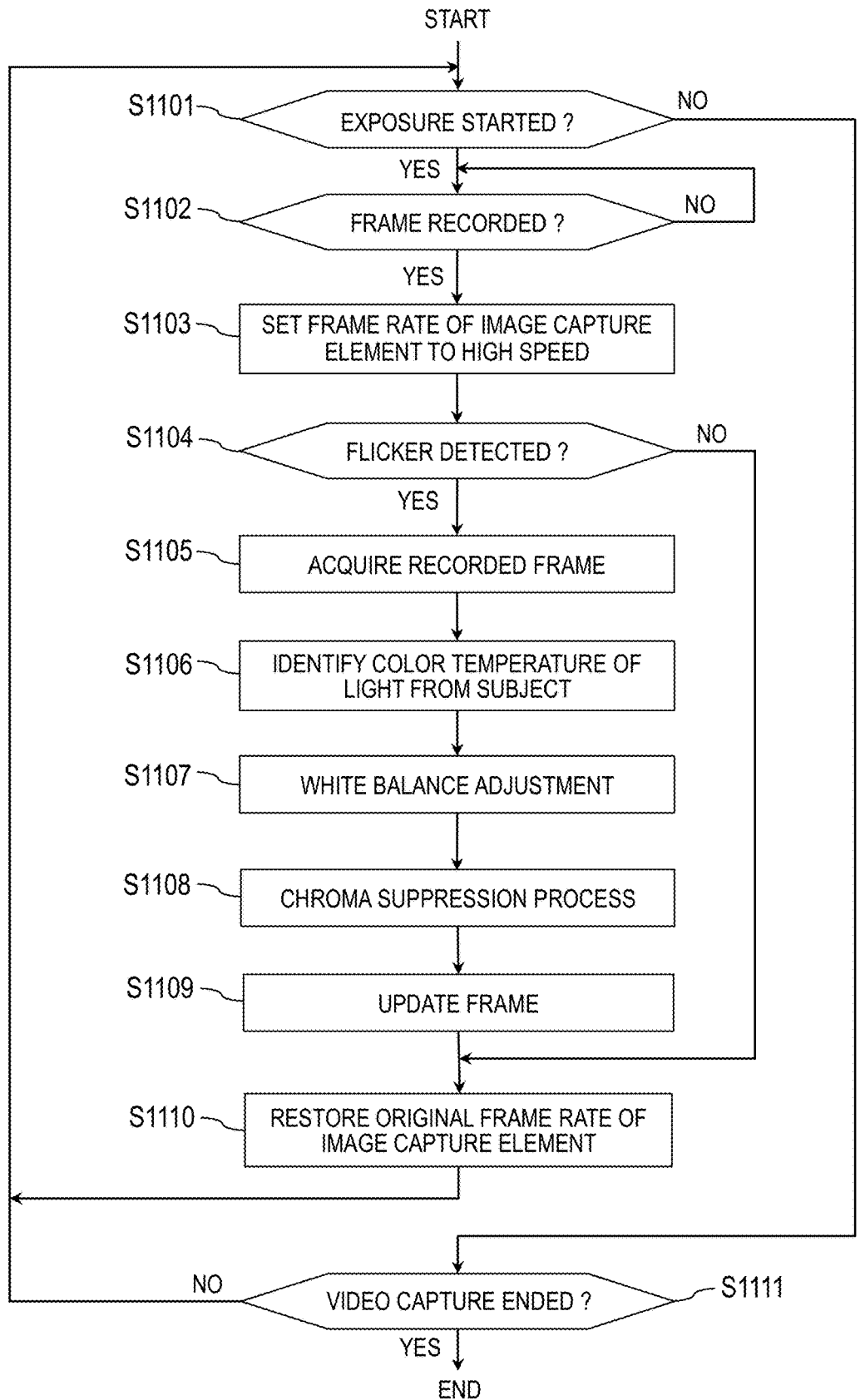
FIG. 11 is a flowchart 1 showing an example of video capturing process steps by the image capture apparatus of the present embodiment.

FIG. 11 is a flowchart 1 showing an example of video capturing process steps by the image capture apparatus 110 of the present embodiment. FIG. 11 is an example of video capturing process steps for when the flickering F is detected by the detection unit 405. First, the image capture apparatus 110 determines whether exposure is being started (step S1101). If exposure is not being started (step S1101: No), then the process progresses to step S1112. In step S1111, the image capture apparatus 110 determines whether video capturing has ended (step S1112). If video capturing has ended (step S1111: Yes), the flowchart is ended. If video capturing has not ended (step S1111: no), then the process returns to step S1101.

If it is determined that exposure has started in step S1101 (step S1101: yes), then the image capture apparatus 110 awaits recording of the frame (step S1102: no). If the frame is recorded in the recording device (step S1102: yes), then the image capture apparatus 110 sets the frame rate of the image capture element 304 to high speed (high speed frame rate setting) (step S1103). In this manner, the flickering F occurs if an LED light source is included in the subject.

Next, the image capture apparatus 110 refers to the read frame after setting a high speed frame rate and detects the flickering F (step S1104). If the flickering F is not detected (step S1104: no), then the process progresses to step S1110. In this manner, if the flickering F was not detected, the process of steps S1105 to S1109 can be omitted, and thus, it is possible to reduce the processing load when performing the video capturing process.

If the flickering F is detected in step S1104 (step S1104: yes), this signifies that an LED light source is present in the subject. Thus, the image capture apparatus 110 acquires the frame recorded in the recording device if the result of step S1102 is yes, and uses the identification unit 402 to identify the color temperature of the light from the subject on the basis of the acquired frame as shown in FIG. 5 (step S1106).

Then, the image capture apparatus 110 uses the adjustment unit 403 to adjust the white balance of the frame on the basis of the identified color temperature as shown in FIG. 5 (step S1107). Thereafter, the image capture apparatus 110 causes the chroma suppression process to be executed by the suppression unit 404 as shown in FIGS. 6 to 8 (step S1108).

Then, the image capture apparatus 110 updates the frame acquired in step S1105 to the frame subjected to chroma suppression (step S1109). Thereafter, the frame rate of the image capture element 304 is restored to the original frame rate (step S1110) and the process returns to step S1101.

In this manner, even when capturing video, by using the gap time ST between frame recording and the start of exposure for the next frame, it is possible to detect the flickering F, or in other words, to detect the LED light source in the subject. In FIG. 11, if the flickering F is not detected, steps S1105 to S1109 are omitted, but a configuration may be adopted in which white balance adjustment is executed for consistency with cases in which the flickering F is detected. Thus, regardless of whether the flickering F was detected, the white balance is adjusted for all frames, and therefore, it is possible to attain a video in which unnatural inconsistencies among consecutive frames are reduced.

<Application Example of 3-Dimensional Model Data of Stadium 100>

Next, an application example of 3-dimensional model data of the stadium 100 will be described. The 3-dimensional model data of the stadium 100 is data in which the 3-dimensional structure of the stadium 100 is modeled. In this data, aside from the field 102, objects such as the lighting 101, the LED billboard 103, and seats are modeled. Each object has 3-dimensional location information. By using 3-dimensional model data of the stadium 100, it is possible to detect an LED light source in the subject when performing still image or video capturing without the need to detect the flickering F.

Figure 12:
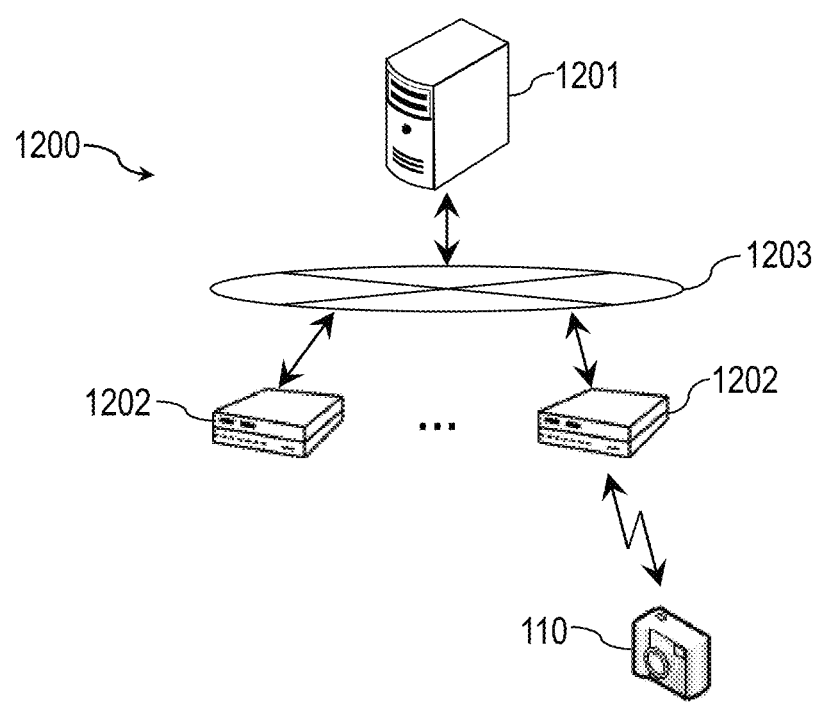
FIG. 12 is a descriptive view showing a configuration example of an imaging system.

FIG. 12 is a descriptive view showing a configuration example of an imaging system. The imaging system is constituted of a server, routers, and the image capture apparatus 110. The image capture apparatus 110 is connected to the server in a manner allowing communication therewith through a LAN (local area network) or the internet by way of a router. The server stores the 3-dimensional model data of the stadium 100. The routers are installed in the stadium 100, for example, and are connected to the communication I/F 315 of the image capture apparatus 110 of a user who visits the stadium 100 in a manner allowing communication therewith.

In this case, the image capture apparatus 110 uses the acquisition unit 401 to acquire the image data (frame in the case of video) on the basis of the imaging direction of the image capture apparatus 110 in the facility identified by current location information of the image capture apparatus 110 and 3-dimensional model data of the facility including a specific light-emitting body in the current location information and a light source that emits light onto the specific light-emitting body.

The current location information of the image capture apparatus 110 is acquired by the GPS receiver 316 shown in FIG. 3. The specific light-emitting body is the LED billboard 103, the light source emitting light onto the specific light-emitting body is the lighting 101, and the facility is the stadium 100, for example. The imaging direction of the image capture apparatus 110 in the facility is acquired by the acceleration sensor 313 and the geomagnetic sensor 314 shown in FIG. 3. Using the acceleration sensor 313 and the geomagnetic sensor 314, it is possible to ascertain the cardinal direction and the degree of incline of the image capture apparatus 110. Thus, by using the 3-dimensional model data, the image capture apparatus 110 can acquire the imaging direction from the current location.

<Still Image Capturing Process Steps 2>

Figure 13:
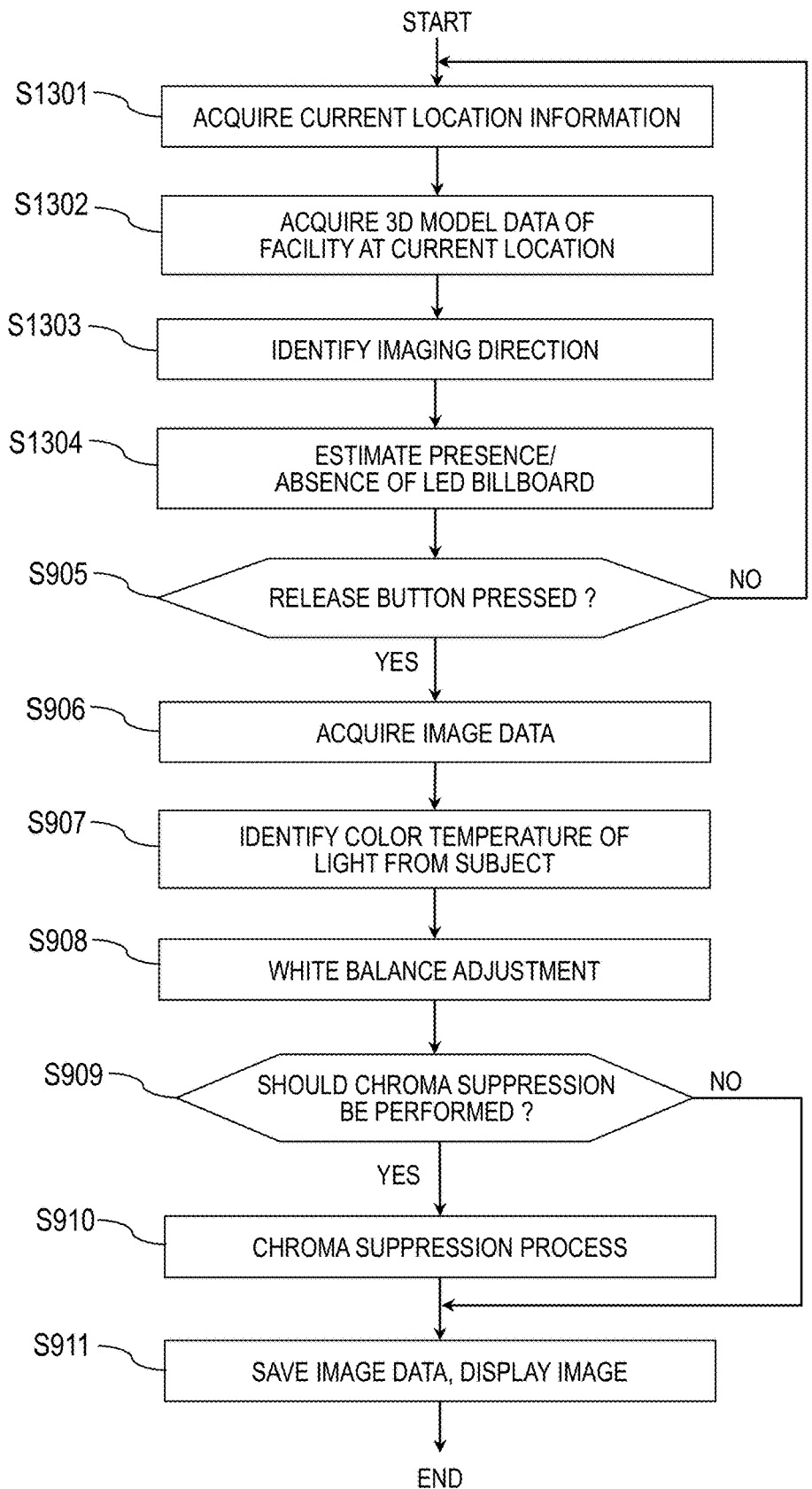
FIG. 13 is a flowchart 2 showing an example of still image capturing process steps by the image capture apparatus of the present embodiment.

FIG. 13 is a flowchart 2 showing an example of still image capturing process steps by the image capture apparatus 110 of the present embodiment. FIG. 13 is an example of still image capturing process steps for when the 3-dimensional model data is used. Process steps that are the same as those in FIG. 9 are assigned the same step numbers and explanations thereof are omitted.

First, the image capture apparatus 110 uses the acquisition unit 401 to acquire the current location information of the image capture apparatus 110 (step S1301). Next, the image capture apparatus 110 acquires the 3-dimensional model data of the facility (stadium 100) in the current location from the server (step S1302). The image capture apparatus 110 uses the 3-dimensional model data of the facility to identify the imaging direction that is the orientation of the lens in the current location of the image capture apparatus 110 (step S1303). The image capture apparatus uses the 3-dimensional model data of the facility to estimate the presence or absence of the LED billboard 103 in the subject in the imaging direction identified in step S1303 (step S1304).

Then, if the release button is not being pressed (step S905: no), then the process returns to step S1301, and if the release button is being pressed (step S905: yes), then the image capture apparatus 110 executes steps S906 to S911 shown in FIG. 9. As a result, it is possible to perform chroma suppression without detecting the flickering F in the subject.

<Video Capturing Process Steps 2>

Figure 14:
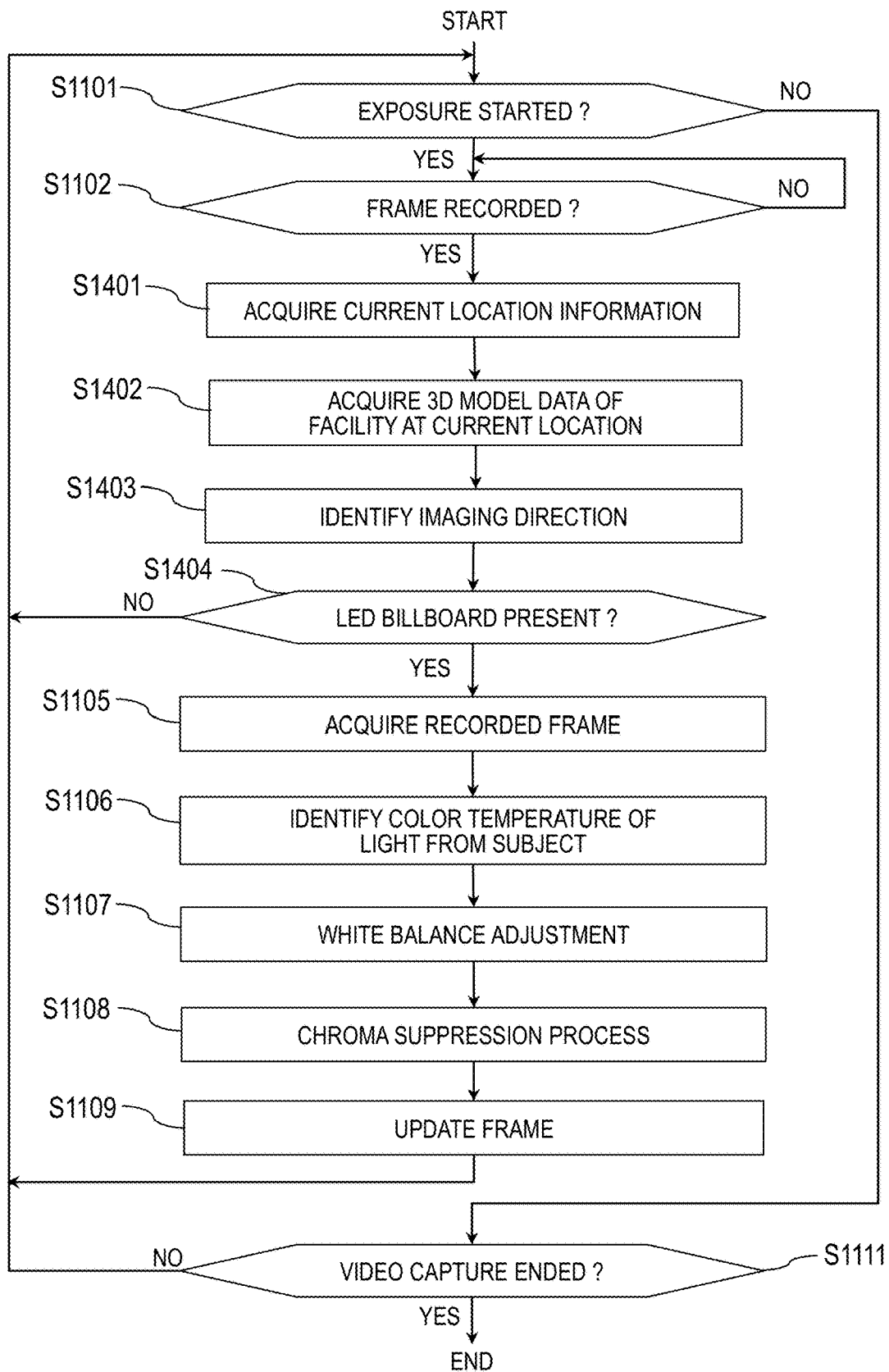
FIG. 14 is a flowchart 2 showing an example of still image capturing process steps by the image capture apparatus of the present embodiment.

FIG. 14 is a flowchart 2 showing an example of still image capturing process steps by the image capture apparatus 110 of the present embodiment. FIG. 14 is an example of video capturing process steps for when the 3-dimensional model data is used. Process steps that are the same as those in FIG. 11 are assigned the same step numbers and explanations thereof are omitted.

If in step S1102 a frame is recorded (step S1102: yes), the image capture apparatus 110 uses the GPS receiver 316, which is an example of the acquisition unit 401, to acquire the current location information of the image capture apparatus 110 (step S1401). The image capture apparatus 110 may acquire from a router 1202, to which the image capture apparatus 110 is connected, the location information of the router 1202 as the current location information of the image capture apparatus 110.

Next, the image capture apparatus 110 acquires the 3-dimensional model data of the facility (stadium 100) in the current location from the server (step S1402). The image capture apparatus 110 uses the 3-dimensional model data of the facility to identify the imaging direction that is the orientation of the lens in the current location of the image capture apparatus 110 (step S1403). The image capture apparatus uses the 3-dimensional model data of the facility to determine whether the LED billboard 103 is present in the subject in the imaging direction identified in step S1303 (step S1404).

If the LED billboard 103 is not present (step S1404: yes), then the process returns to step S1101. In this manner, if the flickering F was not detected, the process of steps S1105 to S1109 can be omitted, and thus, it is possible to reduce the processing load when performing the video capturing process.

If the LED billboard 103 is present in step S1404 (step S1404: yes), then the image capture apparatus 110 executes the process of steps S1105 to S1109 and returns to step S1101.

In this manner, even without detecting the flickering F, by using the gap time ST between frame recording when capturing video and the start of exposure for the next frame, it is possible to detect the LED light source in the subject. In FIG. 14, if the LED billboard 103 is not detected, steps S1105 to S1109 are omitted, but a configuration may be adopted in which white balance adjustment is executed for consistency with cases in which the LED billboard 103 is detected. Thus, regardless of whether the LED billboard 103 was detected, the white balance is adjusted for all frames, and therefore, it is possible to attain a video with a sense of consistency.

(1) Thus, the above-mentioned image capture apparatus 110 includes: an acquisition unit 401 that acquires image data of a subject; an identification unit 402 that identifies a color temperature of light from the subject on the basis of the image data acquired by the acquisition unit 401; an adjustment unit 403 that adjusts a white balance of image data on the basis of the color temperature identified by the identification unit 402; and a suppression unit 404 that suppresses a chroma of the image data applied adjustment by the adjustment unit 403 if image data of a specific light-emitting body (LED billboard 103, for example) is included in the image data.

In this manner, even if the specific light-emitting body for which the color should have been adjusted to white through white balance adjustment is not successfully adjusted to white and has an inaccurate color, it is possible to eliminate the inaccurate color. As a result, white balance adjustment can be made more suitable.

Also, if image data of a specific light-emitting body (LED billboard 103, for example) is included in the image data, the suppression unit 404 may suppress the chroma of the image data applied adjustment by the adjustment unit 403 if the light from the subject is found to have a color temperature indicating blue, green, or amber, on the basis of the color temperature identified by the identification unit 402. As a result, it is possible to perform chroma suppression for the identified color temperature.

(2) In (1) above, the image data is image data including an LED light-emitting body (LED billboard 103, for example) as the specific light-emitting body illuminated by a lighting 101.

In this manner, even if the LED light-emitting body for which the color should have been adjusted to white through white balance adjustment is not successfully adjusted to white and has an inaccurate color, it is possible to eliminate the inaccurate color. Thus, it is possible to bring the color closer to the accurate color of the subject.

(3) Also, in (1), if the light from the subject has a color temperature indicating blue, green, or amber, the suppression unit 404 suppresses the chroma of the image data applied adjustment.

If the light from the subject is blue, the image data of the specific light-emitting body (LED billboard 103, for example) takes on an amber tinge as a result of white balance adjustment. If the light from the subject is green (or blue-green), the image data of the specific light-emitting body (LED billboard 103, for example) takes on a magenta tinge as a result of white balance adjustment. If the light from the subject is amber, the image data of the specific light-emitting body (LED billboard 103, for example) takes on a blue tinge as a result of white balance adjustment. In this manner, if the specific light-emitting body takes on an amber, magenta, or blue tinge after white balance adjustment, such colors can be eliminated by the chroma suppression process, thereby increasing the suitability of white balance adjustment.

(4) In (1), the suppression unit 404 suppresses the chroma of the image data of the specific light-emitting body (LED billboard 103, for example), among the image data applied adjustment.

By narrowing down the item to be subjected to the chroma suppression to image data of the specific light-emitting body, it is possible to suppress the effect of chroma suppression on other image data such as the soccer player P, the spectators, and the field 102 that have already been subjected to white balance adjustment.

(5) In (1), on the basis of an imaging direction of the image capture apparatus 110 in a facility (stadium 100, for example) identified by a current location of the image capture apparatus 110 and 3-dimensional model data of the facility including the specific light-emitting body (LED billboard 103, for example) in the current location and a light source (lighting 101, for example) that emits light onto the specific light-emitting body, the acquisition unit 401 acquires the image data.

In this manner, by the user merely aiming the image capture apparatus 110 at the subject, the image capture apparatus 110 can estimate the presence of the specific light-emitting body in the subject, and it is possible to perform the chroma suppression process on the specific light-emitting body. Also, the facility is not limited to the stadium 100 as long as the facility is provided with the lighting 101 and an LED light source such as the LED billboard 103. Furthermore, the facility is not limited to being outdoors, and may be an indoor facility (such as a gymnasium or an arena) as long as the facility is provided with the lighting 101 and an LED light source such as the LED billboard 103.

(6) In (1), the image capture apparatus 110 further includes a detection unit 405 that detects flickering F by the specific light-emitting body (LED billboard 103, for example) included in the subject according to the image data of the subject, the suppression unit 404 suppressing the chroma of the image data adjusted by the adjustment unit 403 on the basis of the color temperature identified by the identification unit 402 if the flickering F is detected by the detection unit 405.

Detection of the flickering F is used not for suppressing flickering in the image, but rather to identify the presence of the specific light-emitting body. Thus, the image capture apparatus 110 can use the detection unit 405 to deliberately create a state in which the flickering F can be detected in order to detect the presence of the specific light-emitting body. Also, if the image capture apparatus 110 is provided with a function for detecting the flickering F in order to suppress flickering in the image, this function can be additionally used for detecting the presence of the specific light-emitting body, and thus, it is possible to reduce the number of components, the cost, and the size.

(7) In (6), if a predetermined operation input (such as the release button being pressed halfway) is made, the detection unit 405 starts an operation of detecting the flickering F.

In this manner, it is possible to detect the flickering F at an imaging timing intended by the user, or in other words, to detect the specific light-emitting body.

(8) In (6), the image capture apparatus 110 captures video, and the detection unit 405 detects the flickering F from the image data after the image data (frame) is recorded and until exposure for recording image data subsequent to the aforementioned image data is started (gap time ST, for example).

In this manner, it is possible to perform chroma suppression on a frame while capturing video (recording). In FIGS. 11 and 14, the frame is updated in step S1109, but the frame applied chroma suppression may be recorded while leaving remaining the frame recorded in step S1102. As a result, it is possible to save both the original video and the video subjected to white balance adjustment and chroma suppression.

(9) In (6), the identification unit 402 identifies the color temperature of the light from the subject on the basis of the image data if the flickering F is detected by the detection unit 405.

As a result, it is possible to identify the color temperature of the frame only when detecting the flickering F. In other words, for frames in which the flickering F is not detected, color temperature identification is omitted, and thus, it is possible to reduce the processing load when capturing video.

Examples were described above in which the image capture apparatus 110 is a digital camera or a digital video camera, but the image capture apparatus 110 may instead be a smartphone or tablet equipped with a camera, a gaming device, an augmented reality head-mounted display, a personal computer, or an in-vehicle drive recorder. Also, the lens unit 301 and the image capture element 304 may be built into the image capture apparatus 110 or may be detachable from the image capture apparatus 110.

Also, the chroma suppression program may be recorded in a recording medium (CD-ROM, etc.) that can be read by the processor 309, aside from the recording device of the image capture apparatus 110. In this case, the recording medium would be inserted into a personal computer connected to the image capture apparatus 110, and the chroma suppression program would be installed in the image capture apparatus 110 through the personal computer.

Also, the chroma suppression program may be recorded in a server that can communicate with the image capture apparatus 110 so as to be downloadable. Specifically, the image capture apparatus 110 would download the chroma suppression program from the server, for example. In this manner, it is possible to execute the process of the chroma suppression program such as the white balance adjustment and chroma suppression process mentioned above, and detection of the flickering F.

What is claimed is:

1. An image capture apparatus comprising:
an acquisition unit configured to acquire image data of a subject;
an identification unit configured to identify a color temperature of light from the subject based on the image data acquired by the acquisition unit;
an adjustment unit configured to adjust a white balance of the image data based on the color temperature identified by the identification unit; and
a suppression unit configured to suppress a chroma of the image data that has been adjusted by the adjustment unit, when image data of a specific light-emitting body is included in the image data, based on color information of the specific light-emitting body in the image data that has been adjusted by the adjustment unit, by eliminating color of the specific light-emitting body from the image data that has been adjusted by the adjustment unit.

2. The image capture apparatus according to claim 1, wherein the image data is image data including an LED light-emitting body as the specific light-emitting body illuminated by a lighting.

3. The image capture apparatus according to claim 1, wherein the acquisition unit is configured to acquire the image data based on (A) an imaging direction of the image capture apparatus in a facility identified by a current location of the image capture apparatus and (B) 3-dimensional model data indicating a static structure of the facility including (i) the specific light-emitting body in the current location and (ii) a light source that emits light onto the specific light-emitting body.

4. The image capture apparatus according to claim 1, wherein the image data is image data including the specific light-emitting body by which flickering is detected, by a detection unit, as the specific light-emitting body illuminated by a lighting.

5. The image capture apparatus according to claim 4, wherein the detection unit is configured to start an operation of detecting the flickering when a predetermined operation input is made.

6. The image capture apparatus according to claim 4, wherein the image capture apparatus is configured to capture video, and the detection unit is configured to detect the flickering from the image data after the image data is recorded and until exposure for recording image data subsequent to the aforementioned image data is started.

7. The image capture apparatus according to claim 4,
wherein the identification unit is configured to identify the color temperature of the light from the subject based on the image data when the flickering is detected by the detection unit.

8. An image capture apparatus comprising:
an acquisition unit configured to acquire image data of a subject;
an identification unit configured to identify a color temperature of light from the subject based on the image data acquired by the acquisition unit;
an adjustment unit configured to adjust a white balance of the image data based on the color temperature identified by the identification unit; and
a suppression unit configured to suppress a chroma of the image data that has been adjusted by the adjustment unit, when image data of a specific light-emitting body is included in the image data, based on the color temperature identified by the identification unit, by eliminating color of the specific light-emitting body from the image data that has been adjusted by the adjustment unit.

9. The image capture apparatus according to claim 8,
wherein the image data is image data including an LED light-emitting body as the specific light-emitting body illuminated by a lighting.

10. The image capture apparatus according to claim 8,
wherein the image data is image data including the specific light-emitting body by which flickering is detected, by a detection unit, as the specific light-emitting body illuminated by a lighting.

11. The image capture apparatus according to claim 10,
wherein the detection unit is configured to start an operation of detecting the flickering when a predetermined operation input is made.

* * * * *